(12) United States Patent
Jaradi et al.

(10) Patent No.: US 10,940,820 B2
(45) Date of Patent: Mar. 9, 2021

(54) SEATBELT ASSEMBLY INCLUDING AIRBAG

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Zhenyan Gao, Northville, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 16/431,357

(22) Filed: Jun. 4, 2019

(65) Prior Publication Data

US 2020/0384936 A1    Dec. 10, 2020

(51) Int. Cl.
| | |
|---|---|
| *B60R 21/18* | (2006.01) |
| *B60R 21/26* | (2011.01) |
| *B60R 21/235* | (2006.01) |
| *B60R 21/2165* | (2011.01) |
| *B60R 21/2338* | (2011.01) |
| *B60R 22/18* | (2006.01) |

(52) U.S. Cl.
CPC .......... *B60R 21/18* (2013.01); *B60R 21/2165* (2013.01); *B60R 21/235* (2013.01); *B60R 21/2338* (2013.01); *B60R 21/26* (2013.01); *B60R 2021/23519* (2013.01); *B60R 2022/1818* (2013.01)

(58) Field of Classification Search
CPC ................ B60R 21/18; B60R 21/2165; B60R 2022/006
See application file for complete search history.

(56) References Cited

U.S. PATENT DOCUMENTS

| | | | |
|---|---|---|---|
| 3,888,503 A | 6/1975 | Hamilton | |
| 6,688,642 B2 | 2/2004 | Sollars, Jr. | |
| 7,322,603 B2 | 1/2008 | Gray et al. | |
| 8,864,168 B2 | 10/2014 | Ichida et al. | |
| 8,882,141 B2 | 11/2014 | Arnold et al. | |
| 9,944,245 B2 | 4/2018 | Moeller et al. | |
| 2002/0125702 A1* | 9/2002 | Ohhashi | D04B 21/205 280/733 |
| 2006/0237954 A1* | 10/2006 | Kokeguchi | B60R 21/18 280/733 |
| 2017/0349130 A1* | 12/2017 | Faruque | B60R 21/18 |
| 2019/0176738 A1* | 6/2019 | Kim | B60R 21/18 |

FOREIGN PATENT DOCUMENTS

| | | |
|---|---|---|
| CN | 203157921 U | 8/2013 |
| GB | 2408241 A | 5/2005 |
| JP | 2007131225 A | 5/2007 |

\* cited by examiner

*Primary Examiner* — Paul N Dickson
*Assistant Examiner* — Matthew D Lee
(74) *Attorney, Agent, or Firm* — Frank A. MacKenzie; Bejin Bieneman PLC

(57) ABSTRACT

A seatbelt assembly includes a D-ring, a clip spaced from the D-ring, a webbing slideably engaged with the D-ring and the clip, and an airbag slideably receiving the webbing between the D-ring and the clip. The airbag includes a first portion, a second portion, and an intermediate portion therebetween. The first portion and the second portion are inflatable to an inflated position and the intermediate portion is uninflatable.

20 Claims, 8 Drawing Sheets

SEATBELT ASSEMBLY INCLUDING AIRBAG

BACKGROUND

Vehicles include seatbelts for each of the seats. The seatbelt includes webbing that, when the seatbelt is buckled, extends across an occupant of the seat. An anchor attaches one end of the webbing to a vehicle body. The other end of the webbing feeds into a retractor, which includes a spool that pays out and retracts the webbing. A D-ring is mounted to the pillar of the vehicle and supports the seat belt at shoulder level of the occupant. A clip slides freely along the webbing and, when engaged with a buckle, divides the webbing into a lap band and a shoulder band. The webbing controls kinematics of the occupant, e.g., during a vehicle collision. In this role, the shoulder band applies loads across the chest of the occupant.

DETAILED DESCRIPTION

Figure 1A:
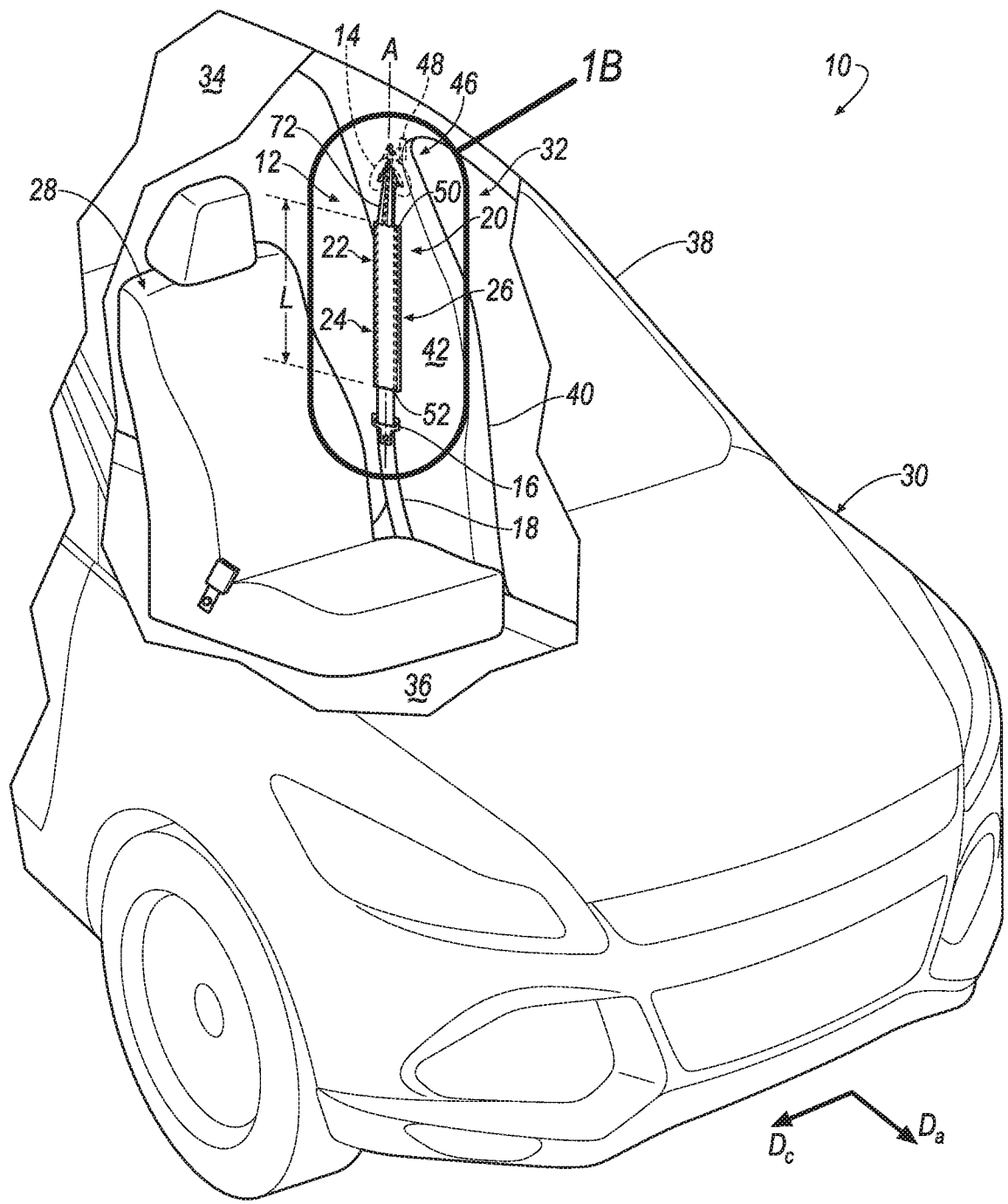
FIG. 1A is a perspective view of a vehicle including a seatbelt assembly having an airbag slideably receiving a webbing.

A seatbelt assembly includes a D-ring, a clip spaced from the D-ring, a webbing slideably engaged with the D-ring and the clip, and an airbag slideably receiving the webbing between the D-ring and the clip. The airbag including a first portion, a second portion, and an intermediate portion therebetween. The first portion and second portion being inflatable to an inflated position and the intermediate portion being uninflatable.

The airbag may be fixed relative to the D-ring.

The airbag may define defines an inflation chamber. The airbag may include a sleeve disposed in the inflation chamber and extending around the webbing.

The intermediate portion may be fixed to the sleeve along the webbing.

The first portion and the second portion each may include an end spaced from the intermediate portion. The ends of the first and second portions may be fixed to the sleeve.

The airbag may include a tether fixed to the D-ring and the sleeve.

The seatbelt assembly may include an inflator disposed adjacent to the D-ring and a fill tube extending from the inflator into the first portion of the airbag.

The tether may extend around the fill tube.

The sleeve may be plastic.

The webbing may be elongated along a longitudinal axis. The airbag may have a rectangular shape in cross-section transverse to the longitudinal axis.

The intermediate portion may be elongated from the first portion to the second portion.

The first portion may be in fluid communication with the second portion through the intermediate portion.

The first portion and the second portion each may include a front, a back spaced from the front, and sides extending from the front to the back. The sides may be folded in an uninflated position.

The intermediate portion may be disposed between the sides of the first and second portions.

The front may be spaced farther from the back in the inflated position as compared to the uninflated position.

The intermediate portion may be disposed between the webbing and the backs of the first and second portions in the inflated position.

The seatbelt assembly may include a cover enclosing the airbag in an uninflated position.

The cover may include a tear seam. The airbag may extend through the tear seam in the inflated position.

The cover may enclose the airbag in the inflated position.

The intermediate portion may be spaced from a torso of an occupant between 5th-percentile female and 95th-percentile male stature engaged with the airbag when the first portion and the second portion are in the inflated position.

With reference to the Figures, wherein like numerals indicate like parts throughout the several views, a vehicle 10 is generally shown. The vehicle 10 includes a seatbelt assembly 12 having a D-ring 14, a clip 16 spaced from the D-ring 14, a webbing 18 slideably engaged with the D-ring 14 and the clip 16, and an airbag 20 slideably receiving the webbing 18 between the D-ring 14 and the clip 16. The airbag 20 includes a first portion 22, a second portion 24, and an intermediate portion 26 therebetween. The first portion 22 and the second portion 24 are inflatable to an inflated position and the intermediate portion 26 is uninflatable The seatbelt assembly 12 may be engageable with a seat 28, as discussed below. During a vehicle impact, the momentum of an occupant may bias the occupant relative to the seat 28. For example, in a front impact or an oblique impact, the momentum of the occupant may bias the occupant away from the seat 28. During the vehicle impact, the airbag 20, e.g., the first portion 22 and the second portion 24, may be deployed from an uninflated position, as shown in FIGS. 1A-2B, to the inflated position, as shown in FIGS. 3A-3C. When the occupant moves away from the seat 28, the seatbelt assembly 12, e.g., the webbing 18 and the airbag 20, may control the kinematics of the occupant. Specifically, as the occupant impacts the airbag 20, the first portion 22 and the second portion 24 may redistribute load on the occupant.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in a vehicle fore-and-aft direction Da. Each side of the vehicle 10 may be similar or identical to each other.

Figure 2A:
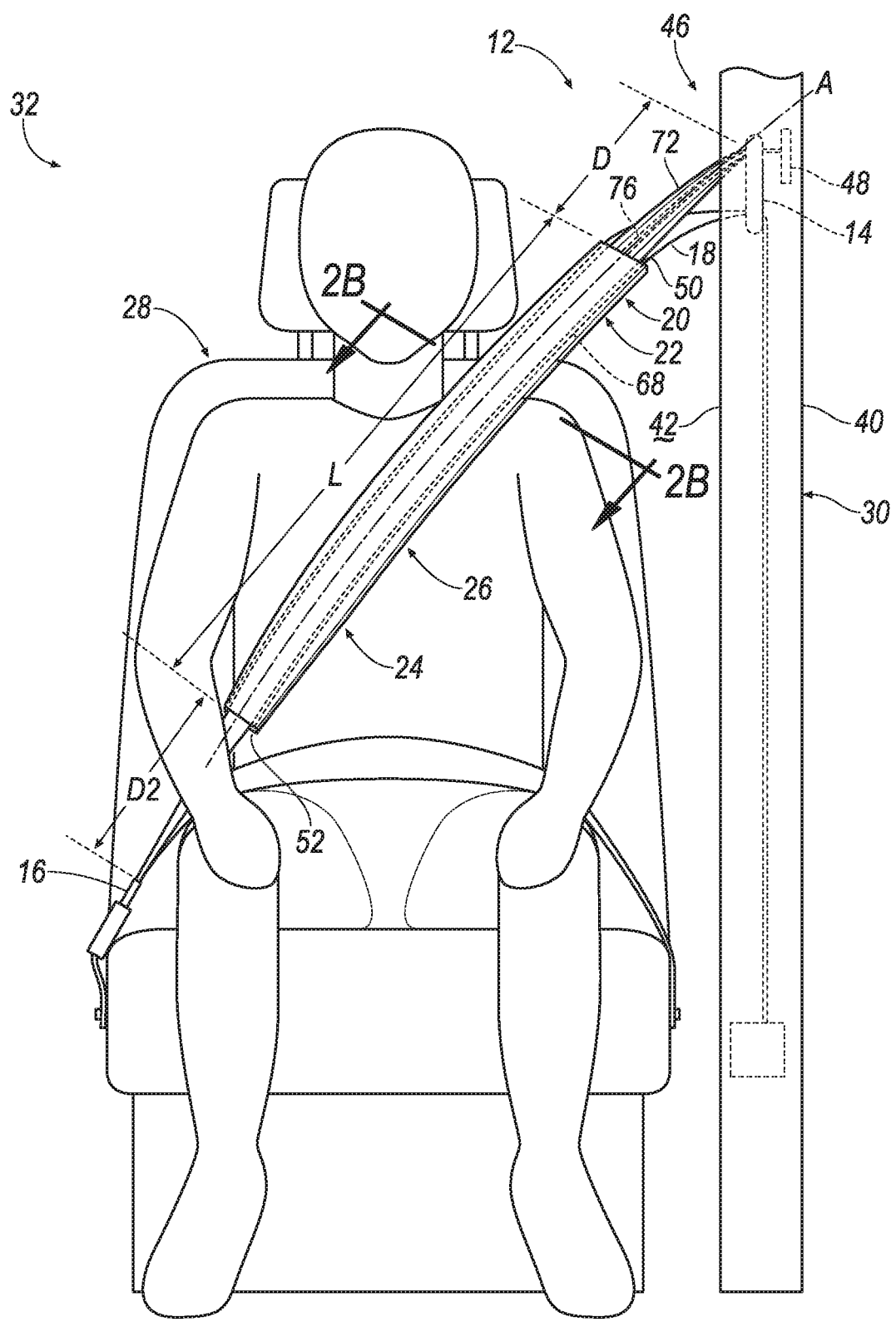
FIG. 2A is a front view of the seatbelt assembly including the airbag in the uninflated position.

With reference to FIG. 1A, the vehicle 10 includes a body 30 defining a passenger cabin 32. The passenger cabin 32 houses occupants, if any, of the vehicle 10. The passenger cabin 32 includes a front end (not numbered) and a rear end (not numbered) with the front end being in front of the rear end during forward movement of the vehicle 10. The passenger cabin 32 includes one or more seats 28. The seats 28 may be arranged in any suitable arrangement. For example, one or more of the seats 28 may be at the front end of the passenger cabin 32, i.e., a front seat, and/or one or more of the seats 28 may be at the rear end of the passenger cabin 32, i.e., a rear seat. Specifically, the passenger cabin 32 may include two front seats 28, i.e., a driver seat and a passenger seat, spaced from each other in the cross-vehicle direction Dc.

With continued reference to FIG. 1A, the body 30 may include a roof 34, a floor 36 spaced from the roof 34, and a plurality of pillars 38, 40 extending downwardly from the roof 34, i.e., generally towards the floor 36. The roof 34 and the floor 36 may each extend across the passenger cabin 32, i.e., from one side to the other side of the vehicle 10 and from the front end to the rear end of the passenger cabin 32. The roof 34 may define an upper boundary of the passenger cabin 32 and the floor 36 may define a lower boundary of the passenger cabin 32.

With continued reference to FIG. 1A, the pillars 38, 40 may include an A-pillar 38 disposed adjacent the front end of the passenger cabin 32, and a B-pillar 40 spaced from the A-pillar 38 in the vehicle fore-and-aft direction Da. The front seats 28 may, for example, be disposed between the A-pillar 38 and the B-pillar 40. The pillars 38, 40 may include additional pillars, e.g., a C-pillar (not shown). Each side of the vehicle 10 may include the plurality of pillars 38, 40. In other words, the vehicle 10 may include two A-pillars 38 and two B-pillars 40, e.g., one A-pillar 38 and one B-pillar 40 is disposed on each side of the vehicle 10.

With continued reference to FIG. 1A, a pillar trim 42 may be attached to the B-pillar 40. The pillar trim 42 may extend at least partially along the B-pillar 40. For example, the pillar trim 42 may be monolithic, e.g., a single piece extending from the roof 34 to the floor 36. As another example, the pillar trim 42 may include a plurality of components that are separately formed and subsequently attached together. The pillar trim 42 may be attached to the B-pillar 40 by in any suitable manner, e.g., clips, fasteners, etc. The pillar trim 42 may be any suitable material, e.g., plastic, vinyl, etc.

Figure 1B:
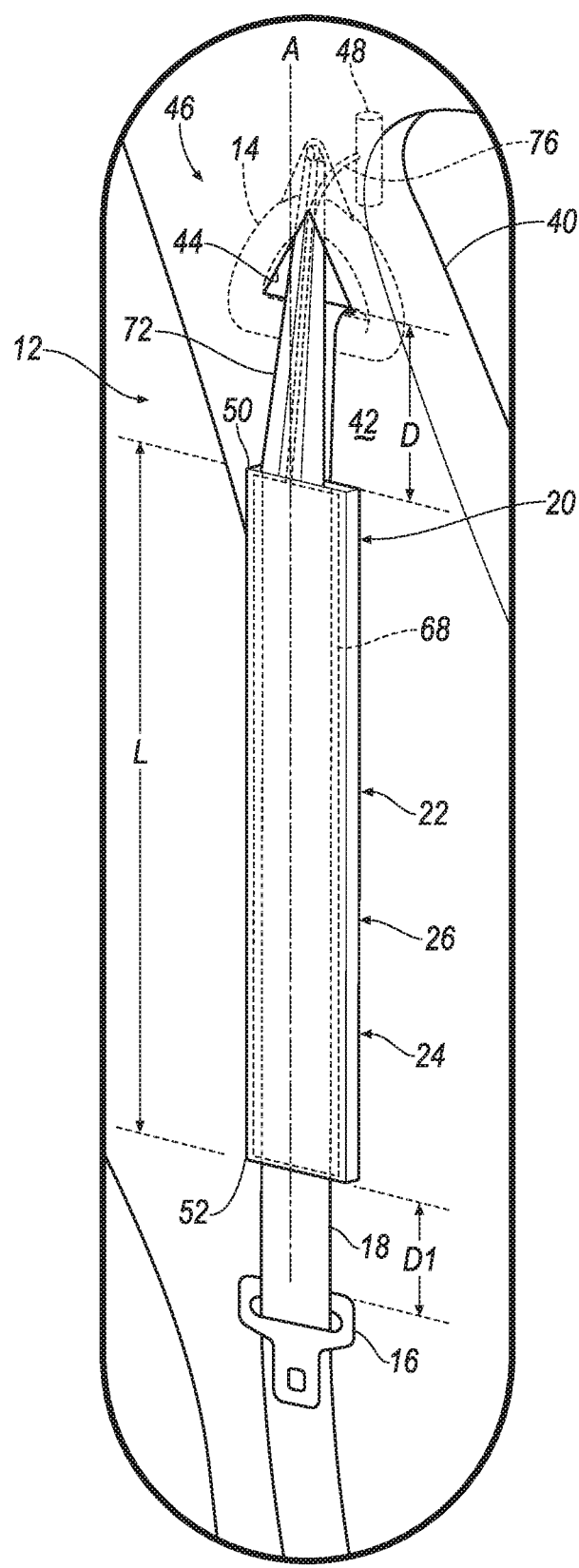
FIG. 1B is a magnified view of the seatbelt assembly including the airbag in an uninflated position.

With reference to FIG. 1B, the pillar trim 42 may, for example, include an opening 44. The opening 44 may extend through the pillar trim 42 in the cross-vehicle direction Dc. The opening 44 may, for example, face towards the front seats 28. The seatbelt assembly 12 may be engaged with the opening 44, as discussed further below.

Each seat 28 is supported by the floor 36, as shown in FIG. 1A. The position and orientation of the seats 28 and components thereof may be adjustable by an occupant. In this situation, each seat 28 may slide relative to the floor 36, e.g., in the vehicle fore-and-aft direction Da, along a seat track (not shown). As another example, each seat 28 may be fixed relative to the floor 36. In this situation, the seats 28 may be immovable relative to the floor 36. Each seat 28 is disposed adjacent to one respective pillar.

The vehicle 10 may include any suitable number of seatbelt assemblies 12. For example, the vehicle 10 may include one seatbelt assembly 12 for each seat 28. In such an example, each seatbelt assembly 12 may be disposed adjacent to one seat 28. Each seatbelt assembly 12, when fastened, retains the occupant on the respective seat 28, e.g., during sudden decelerations of the vehicle 10.

The seatbelt assembly 12 may include a retractor (not numbered) and the webbing 18 retractably payable from the retractor. Additionally, the seatbelt assembly 12 may include an anchor (not numbered) coupled to the webbing 18, and the clip 16 selectively engageable with a seatbelt buckle (not numbered).

The retractor may be attached to the body 30. For example, the retractor may be attached to the B-pillar 40. As another example, when the seatbelt assembly 12 is adjacent the rear seat, the retractor may be attached to the C-pillar. Alternatively, the retractor may be attached to the seat 28, e.g., a frame (not shown) of the seat 28. The retractor may be attached to the body 30 in any suitable manner, e.g., fasteners.

The D-ring 14 is attached to the body 30. For example, the D-ring 14 may be attached to the B-pillar 40, as shown in FIGS. 1A-2A, and 3A. The D-ring 14 is be spaced from the retractor. For example, the D-ring 14 may be disposed between the retractor and the roof 34. In other words, the D-ring 14 may be disposed above the retractor. The pillar trim 42 may extend over the D-ring 14, as shown in FIGS. 1A-2A, and 3A. In other words, the pillar trim 42 may be disposed between the D-ring 14 and the occupant. The D-ring 14 may, for example, be aligned with the opening 44 of the pillar trim 42. In other words, the D-ring 14 may be spaced from the opening 44 in the pillar trim 42 in the cross-vehicle direction Dc.

The D-ring 14 supports the webbing 18 and redirects tension applied thereto. For example, the webbing 18 may extend from the retractor through the D-ring 14. The D-ring 14 may include a slot (not numbered). The webbing 18 may be slideably disposed within the slot of the D-ring 14. In other words, the webbing 18 may freely slide through the D-ring 14. Additionally, the webbing 18 may slide through the opening 44 of the pillar trim 42, as shown in FIG. 1B. The D-ring 14 may be metal, plastic, or any suitable material.

The webbing 18 may be retractable to a retracted position and extendable to an extended position relative to the retractor. In the retracted position, the webbing 18 may be retracted into the retractor, i.e., wound around a spool (not shown), as shown in FIGS. 1A and 1B. In the extended position, the webbing 18 may be paid out from the retractor, e.g., towards the occupant, as shown in FIGS. 2A, 3A, and 3C. The webbing 18 is moveable, e.g., between the retracted position and the extended position, relative to the airbag 20.

The webbing 18 may include a first end (not shown) and a second end (not numbered). The webbing 18 extends continuously from the first end to the second end. The first end of the webbing 18 is retractably engaged with the retractor, i.e., feeds into the retractor. The second end of the webbing 18 may be attached to the anchor. The anchor may, for example, be attached to the seat 28, e.g., a seat bottom. Alternatively, the anchor may be attached to the body 30, e.g., the B-pillar 40, the floor 36, etc. The anchor may be attached to the body 30 in any suitable manner, e.g., with fasteners. The webbing 18 may be a woven fabric, e.g., woven nylon.

The clip 16 is slideably engaged with the webbing 18. The clip 16 may, for example, slide freely along the webbing 18, e.g., relative to the airbag 20, and selectively engage with the seatbelt buckle. In other words, the webbing 18 may be engageable with the seatbelt buckle. The clip 16 may, for example, be releasably engageable with the seatbelt buckle from a buckled position, as shown in FIGS. 2A, 3A, and 3C, to an unbuckled position, as shown in FIGS. 1A and 1B. The clip 16 may, for example, be disposed between the anchor and the D-ring 14 to pull the webbing 18 from the unbuckled position to the buckled position. The webbing 18 may be elongated along a longitudinal axis A from the D-ring 14 to the clip 16, as shown in FIGS. 1A-2A and 3A.

In the unbuckled position, the clip 16 may move relative to the seatbelt buckle. In other words, the webbing 18 may be retractable into the retractor when the clip 16 is in the unbuckled position. In the buckled position, the webbing 18 may be fixed relative to the seatbelt buckle. In other words, the seatbelt buckle may prevent the webbing 18 from retracting into the retractor. When the clip 16 is engaged with the seatbelt buckle, i.e., in the buckled position, the clip 16 may divide the webbing 18 into a lap band and a shoulder band.

The seatbelt assembly 12 may be a three-point harness meaning that the webbing 18 is attached at three points around the occupant when fastened: the anchor, the retractor, and the seatbelt buckle. The seatbelt assembly 12 may, alternatively, include another arrangement of attachment points.

The seatbelt assembly 12 includes an airbag assembly 46. The airbag assembly 46 includes the airbag 20 and an inflator 48. The B-pillar 40 may support the airbag assembly 46, and specifically, may support the airbag 20 when the airbag 20 is in the inflated position. For example, the airbag assembly 46 may be mounted to the B-pillar 40, as set forth below.

The airbag 20 may be a single continuous unit, e.g., a single piece of fabric. Alternatively, the airbag 20 may include a plurality of segments, i.e., two or more. The segments may be attached to each other in any suitable fashion, e.g., a plurality of panels attached by stitching, ultrasonic welding, etc.

The airbag 20 may be formed of any suitable type of material, e.g., from a woven polymer. For example, the airbag 20 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

Figure 2B:
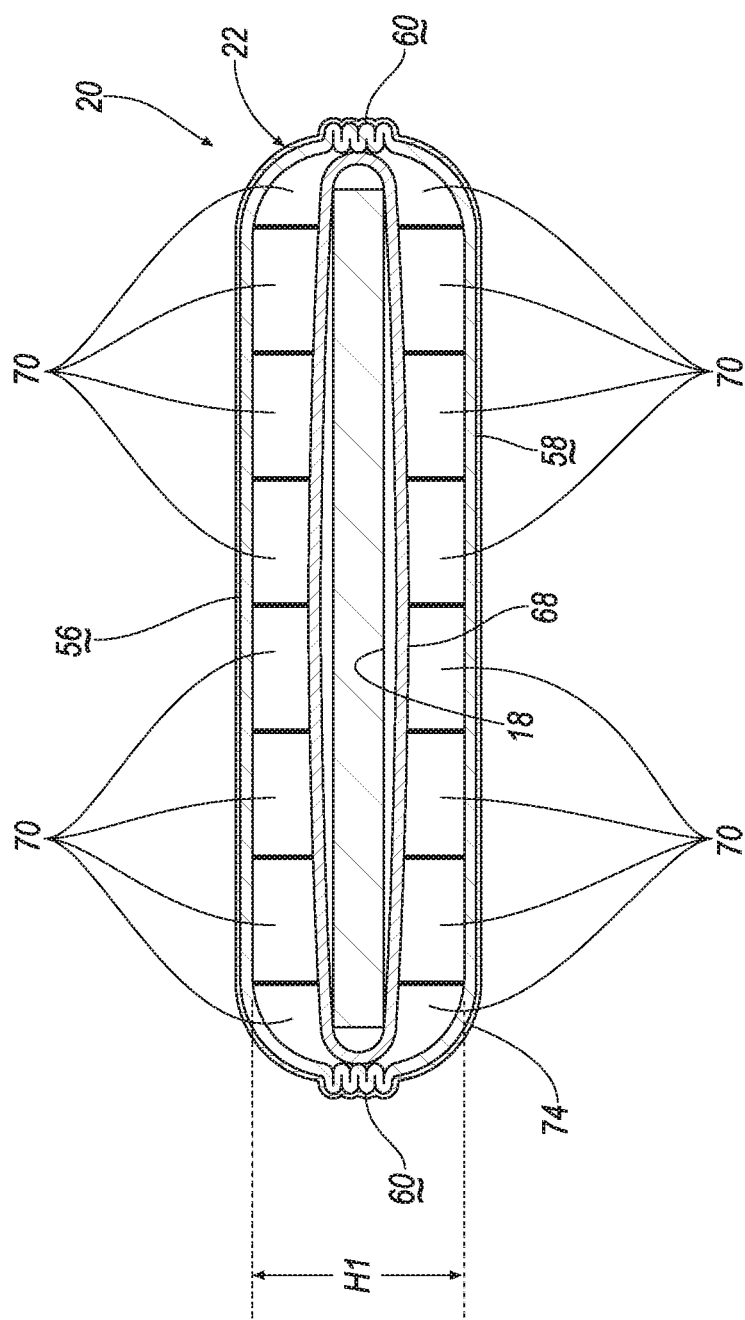
FIG. 2B is a cross-sectional view along line 2B of FIG. 2A.
Figure 3A:
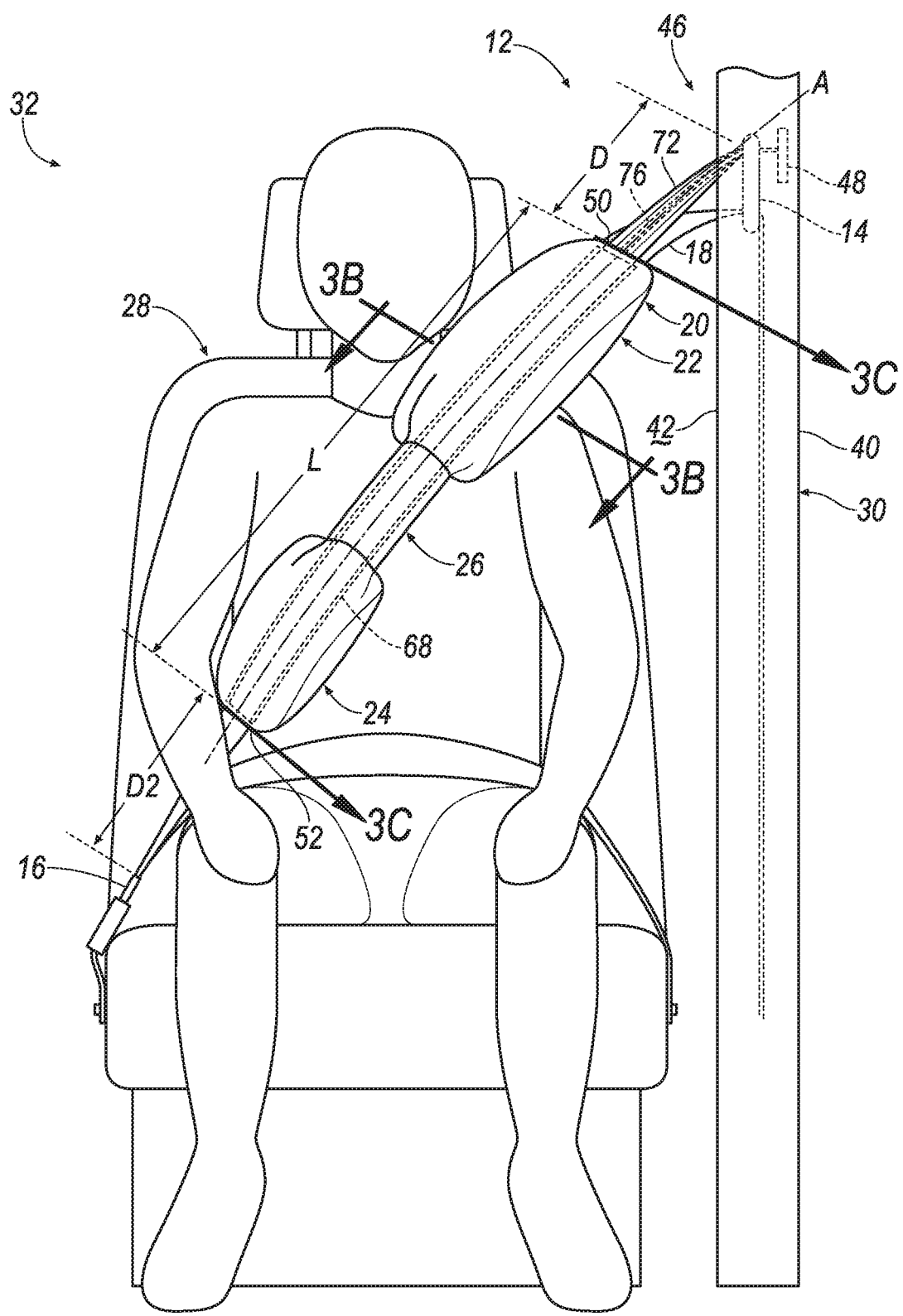
FIG. 3A is a front view of the seatbelt assembly including the airbag in an inflated position.
Figure 3B:
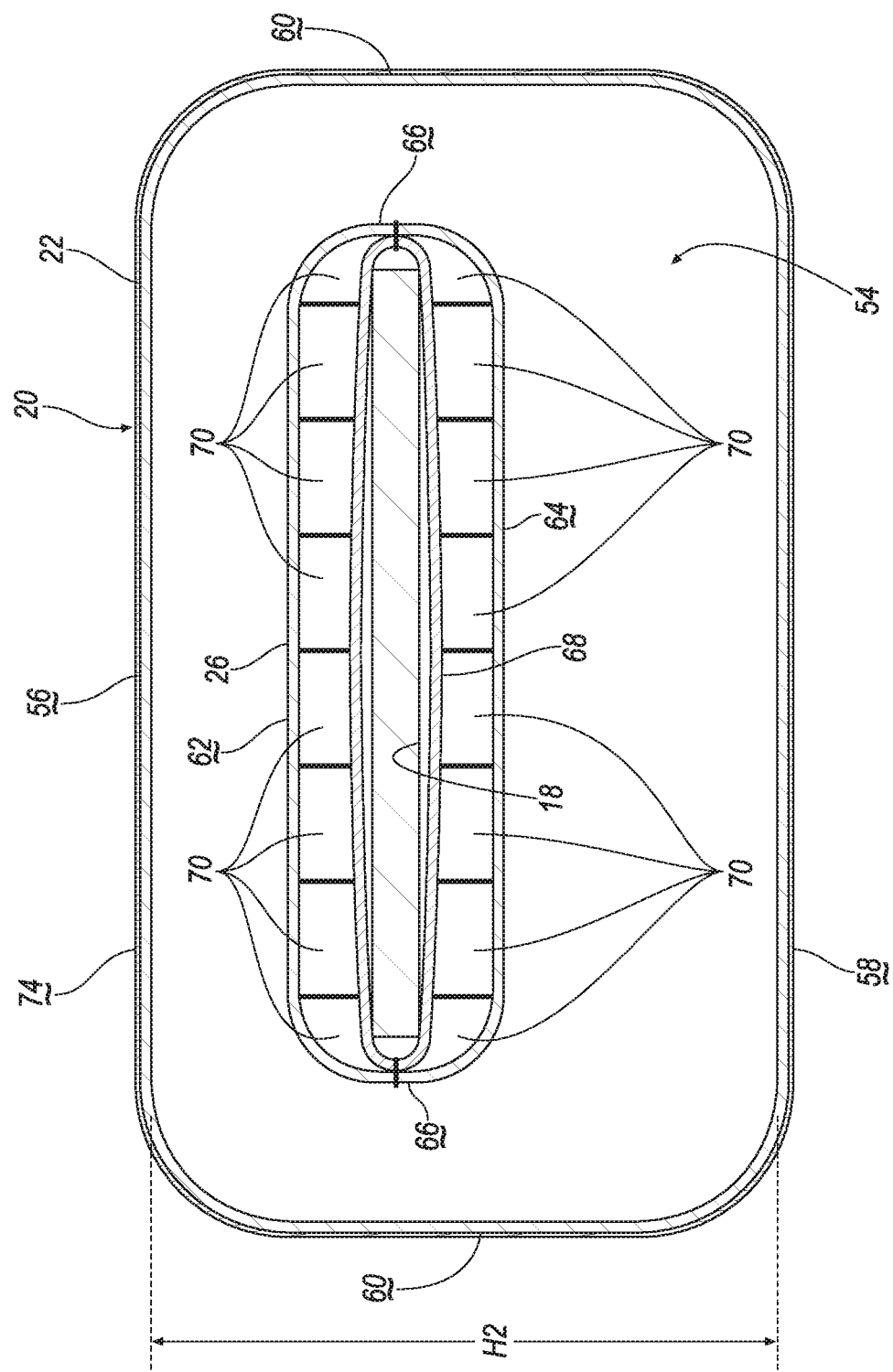
FIG. 3B is a cross-sectional view along line 3B of FIG. 3A.
Figure 3C:
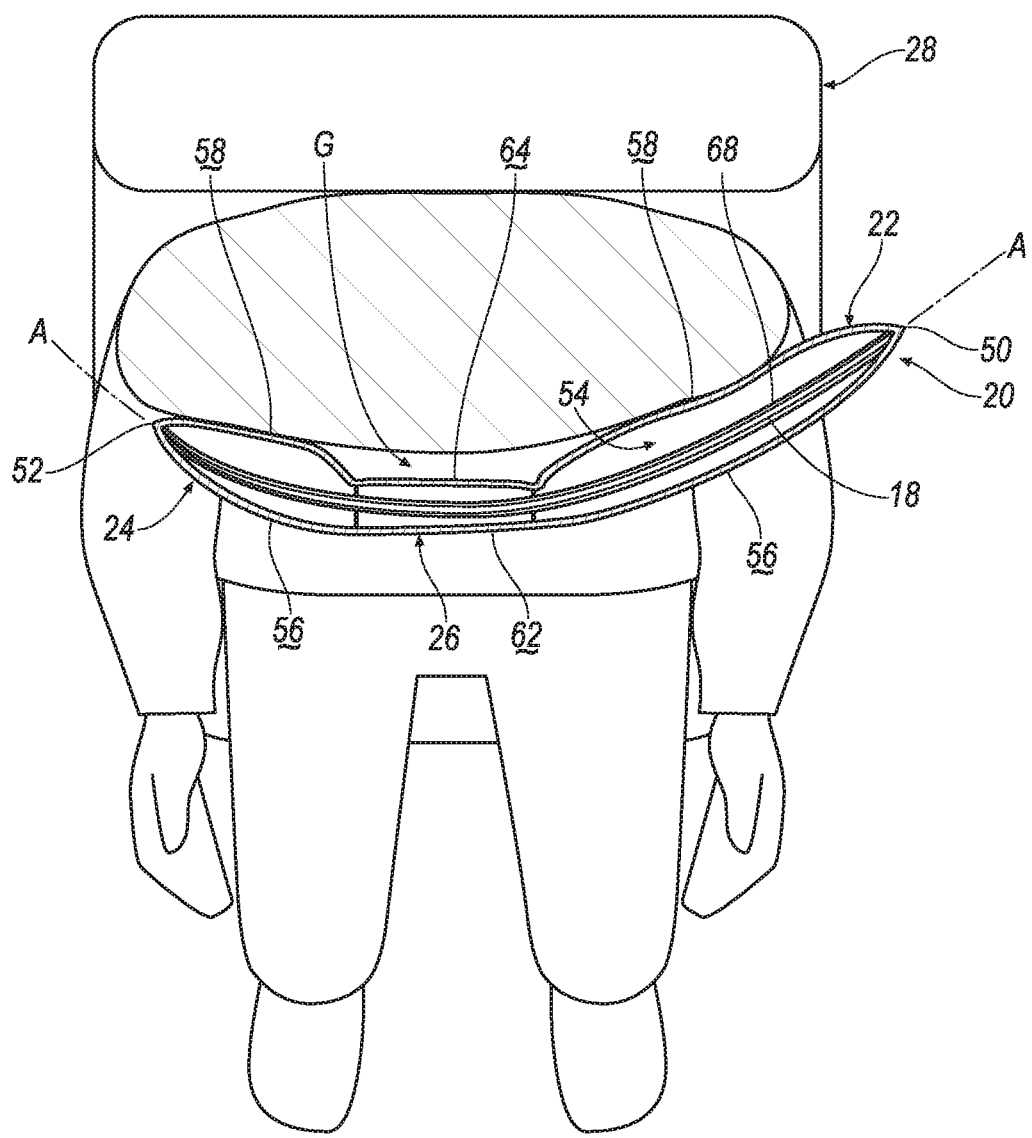
FIG. 3C is a cross-section view along line 3C of FIG. 3A.

The airbag 20 is disposed between the D-ring 14 and the clip 16, as shown in the Figures, and the airbag 20 extends around the webbing 18, as shown in FIGS. 2B and 3B. In other words, the airbag 20 extends around at least a portion of the shoulder band of the webbing 18. As set forth above, the airbag 20 slideably receives the webbing 18. In other words, the webbing 18 is slideable relative to the airbag 20. Additionally, the clip 16 is moveable relative to the airbag 20. The clip 16 may, for example, be disposed closer to the airbag 20 when the webbing 18 is in the retracted position as compared to when the webbing 18 is in the extended position. The clip 16 may be spaced from the airbag 20 by a first distance D1, e.g., along the longitudinal axis A of the webbing 18, when the webbing 18 is in the retracted position, as shown in FIGS. 1A-1B, and the clip 16 may be spaced from the airbag 20 by a second distance D2, e.g., along the longitudinal axis A of the webbing 18, when the webbing 18 is in the extended position, as shown in FIGS. 2A and 3A. The second distance D2 may be greater than the first distance D1. The first distance D1 and the second distance D2 may each extend from the second portion 24 to the clip 16.

The airbag 20 may be fixed relative to the D-ring 14, as discussed below. For example, a distance D, e.g., along the longitudinal axis A of the webbing 18, between the D-ring 14 and the airbag 20 may be uniform when the webbing 18 is in both the retracted position and the extended position. The distance D may extend from the D-ring 14 to the first portion 22, as shown in FIGS. 1B, 2A, and 3A.

The airbag 20 defines an inflation chamber 54, as shown in FIG. 3B. Specifically, the first portion 22 and the second portion 24 define the inflation chamber 54. The first portion 22 and the second portion 24 may be in fluid communication through the intermediate portion 26, as discussed below. During inflation, the inflation chamber 54 may be inflated from the uninflated position to the inflated position. In other words, the first portion 22 and the second portion 24 may expand, e.g., towards the occupant, during inflation to the inflated position. Said differently, the size, e.g., perimeter, of the first portion 22 and the second portion 24 in cross-section transverse to the longitudinal axis A of the webbing 18 may increase during inflation from the uninflated position to the inflated position. Since the intermediate portion 26 is uninflatable, the size, e.g., perimeter, of the intermediate portion 26 in cross-section transverse to the longitudinal axis A of the webbing 18 remains uniform during inflation from the uninflated position to the inflated position.

The first portion 22 of the airbag 20 may be disposed between the D-ring 14 and the intermediate portion 26 of the airbag 20. The first portion 22 of the airbag 20 may, for example, include an end 50 spaced from the intermediate portion 26. The first portion 22 of the airbag 20 may be elongated from the end 50 to the intermediate portion 26, e.g., along the longitudinal axis A of the webbing 18.

The second portion 24 of the airbag 20 may be disposed between the intermediate portion 26 of the airbag 20 and the clip 16. The second portion 24 of the airbag 20 may, for example, include an end 52 spaced from the intermediate portion 26. The second portion 24 may be elongated from the intermediate portion 26 to the end 52, e.g., along the webbing 18.

The first portion 22 and the second portion 24 each include a front 56 and a back 58 spaced from the front 56, e.g., transverse to the longitudinal axis A of the webbing 18. The front 56 and the back 58 may each extend from the intermediate portion 26 to the respective end 50, 52 of the respective portion 22, 24. The back 58 of each portion 22, 24 may, for example, face the occupant when the clip 16 is in the buckled position, as shown in FIG. 3C. For example, the back 58 of the first and second portions 22, 24 may abut the torso of the occupant between 5th-percentile female and 95th-percentile male stature engaged with the airbag 20 when the first portion 22 and the second portion 24 are in the uninflated position. Additionally, the back 58 of the first and second portions 22, 24 abut the torso of the occupant between 5th-percentile female and 95th-percentile male stature engaged with the airbag 20 when the clip 16 is in the buckled position and when the airbag 20 is in the inflated position. The front 56 of the first and second portions 22, 24 may, for example, face away from the occupant when the clip 16 is in the buckled position, as shown in FIG. 3C. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 110 pounds, e.g., the Hybrid III $5^{th}$ percentile female. As another example, NHTSA has defined the $95^{th}$ percentile male stature to be 6 feet 2 inches tall and 223 pounds, e.g., the Hybrid III $95^{th}$ percentile male.

The first portion 22 and the second portion 24 each include sides 60 extending from the respective front 56 to the respective back 58. The sides 60 of the first portion 22 and the second portion 24 may be folded when the first and second portions 22, 24 are in the uninflated position, as shown in FIG. 2B. The sides 60 of the first portion 22 and the second portion 24 may be folded in any suitable manner, e.g., fan fold. During inflation to the inflated position, the sides 60 of the first and second portions 22, 24 may expand, i.e., unfold, transverse to the longitudinal axis A of the webbing 18. For example, the sides 60 may extend a first height H1 in the uninflated position, as shown in FIG. 2B, and a second height H2 in the inflated position, as shown in FIG. 3B. The second height H2 is greater than the first height H1. In other words, in the inflated position, the front 56 of the first and second portions 22, 24 may be spaced farther from the back 58 of the respective portion as compared to the uninflated position.

In the inflated position, the first portion 22 and the second portion 24 may have any suitable polygonal shape in cross-section transverse to the longitudinal axis A of the webbing 18. For example, the first portion 22 and the second portion 24 may have a rectangular shape in cross-section transverse to the longitudinal axis A of the webbing 18, as shown in FIG. 3B. Alternatively, the first portion 22 and the second portion 24 may have a square shape, a trapezoidal shape, or any other suitable polygonal shape in cross-section transverse to the longitudinal axis A of the webbing 18.

The intermediate portion 26 is elongated from the first portion 22 to the second portion 24, as shown in FIG. 3A. The intermediate portion 26 may include a front 62 and a back 64 spaced from the front 62, e.g., transverse to the longitudinal axis A of the webbing 18, as shown in FIG. 3C. The front 62 and the back 64 of the intermediate portion 26 each extend from the first portion 22 to the second portion 24. The back 64 of the intermediate portion 26 may, for example, face the torso of the occupant seated in the seat 28 when the clip 16 is in the buckled position. The front 62 of the intermediate portion 26 may face away from the occupant when the clip 16 is in the buckled position.

When the airbag 20 is in the uninflated position, the back 64 of the intermediate portion 26 may extend in a common plane as the backs 58 of the first and second portions 22, 24. In such an example, the back 64 of the intermediate portion 26 may abut the torso of an occupant between 5th-percentile female and 95th-percentile male stature engaged with the airbag 20 when the first portion 22 and the second portion 24 are in the uninflated position. When the airbag 20 is in the inflated position, the back 64 of the intermediate portion 26 is disposed between the back 58 and the front 56 of the first and second portions 22, 24, as shown in FIG. 3B. In other words, the back 64 of the intermediate portion 26 is disposed between the webbing 18 and the backs 58 of the first and second portions 22, 24 in the inflated position. In this situation, the back 64 of the intermediate portion 26 is spaced from the torso of the occupant between 5th-percentile female and 95th-percentile male stature engaged with the airbag 20 when the first portion 22 and the second portion 24 are in the inflated position, as shown in FIG. 3C. In other words, intermediate portion 26 and the torso of the occupant may define a gap G therebetween when the first and second portions 22, 24 are in the inflated position.

The intermediate portion 26 may include sides 66 extending from the front 62 of the intermediate portion 26 to the back 64 of the intermediate portion 26. When the airbag 20 is in the uninflated position, the intermediate portion 26 extends from one side 60 of the first and second portions 22, 24 to the other side 60 of the first and second portions 22, 24, as shown in FIGS. 1A-2A. In other words, the sides 66 of the intermediate portion 26 are spaced from the longitudinal axis A of the webbing 18 a same amount as the sides 60 of the first and second portions 22, 24 in the uninflated position. Said differently, the intermediate portion 26 has a same width transverse to the longitudinal axis A of the webbing 18 as the first portion 22 and the second portion 24 in the uninflated position. When the airbag 20 is in the inflated position, the sides 66 of the intermediate portion 26 are disposed between the sides 60 of the first and second portions 22, 24, as shown in FIGS. 3A and 3B. In other words, the first and second portions 22, 24 may be wider than the intermediate portion 26 in the inflated position.

The airbag 20 may, for example, have a length L extending along the longitudinal axis A of the webbing 18. The length L of the airbag 20 may extend from the end 50 of the first portion 22 to the end 52 of the second portion 24. The length L of the airbag 20 may be uniform. In other words, the length L of the airbag 20 may be the same when the webbing 18 is in the retracted position and when the webbing 18 is in the extended position.

With reference to FIGS. 2B and 3B, the airbag 20 may include a sleeve 68 disposed in the inflation chamber 54. The sleeve 68 may be designed, i.e., sized and position, to slideably receive the webbing 18. In other words, the sleeve 68 may extend around the webbing 18, e.g., about the longitudinal axis A of the webbing 18. Said differently, the sleeve 68 may be hollow, and the webbing 18 may extend and slide through the sleeve 68. The sleeve 68 may be any suitable material, e.g., plastic, woven polymer, etc.

The sleeve 68 may be elongated along the longitudinal axis A of the webbing 18. For example, the sleeve 68 may extend from the end 50 of the first portion 22 to the end 52 of the second portion 24, i.e., the entire length L of the airbag 20. The sleeve 68 may, for example, be fixed to the end 50 of the first portion 22 and the end 52 of the second portion 24. The first portion 22 and the second portion 24 may be fixed to the sleeve 68 entirely about the longitudinal axis A of the webbing 18. The sleeve 68 may be fixed to the ends 50, 52 of the first and second portions 22, 24 by any suitable manner, e.g., stitching, ultrasonic welding, etc.

The sleeve 68 may be fixed to the intermediate portion 26, as shown in FIG. 3B. For example, the sleeve 68 may be fixed to the intermediate portion 26 from the first portion 22 to the second portion 24, i.e., along the longitudinal axis A of the webbing 18. Additionally, the sleeve 68 may be fixed to the intermediate portion 26 about the longitudinal axis A of the webbing 18. In other words, the front 62, the back 64, and the sides 66 of the intermediate portion 26 may be fixed to the sleeve 68. By fixing the intermediate portion 26 to the sleeve 68, the intermediate portion 26 is prevented from expanding, i.e., moving away from the sleeve 68, during inflation of the first and second portions 22, 24. In other words, the first portion 22 and the second portion 24 are inflated by the fluid, e.g., an inflation medium, and the intermediate portion 26 remains uninflated. The sleeve 68 may be fixed to the intermediate portion 26 in any suitable manner, e.g., a plurality of tethers, stitching, ultrasonic welding, etc.

As set forth above, the first portion 22 and the second portion 24 are in fluid communication through the intermediate portion 26. In other words, at least a portion of the intermediate portion 26 is spaced from the sleeve 68. In this situation, the intermediate portion 26 and the sleeve 68 may define one or more channels 70 therebetween, as shown in FIGS. 2B and 3B. The channels 70 may be elongated from the first portion 22 to the second portion 24, i.e., along the longitudinal axis A of the webbing 18. Each channel 70 may allow fluid flow from the first portion 22 through the intermediate portion 26 to the second portion 24.

The airbag 20 may include a tether 72 extending from the D-ring 14 to the sleeve 68. In this situation, the tether 72 extends through the opening 44 in the pillar trim 42, as shown in FIGS. 1A and 1B. The tether 72 may be fixed to the D-ring 14, e.g., by fasteners. The tether 72 and the sleeve 68 may be integral, i.e., formed simultaneously as a one-piece construction. In other words, the tether 72 and the sleeve 68 may be formed simultaneously, e.g., by injection molding. In alternative to being integral, the tether 72 and the sleeve 68 may be formed separately and subsequently joined. In this situation, the tether 72 and sleeve 68 may be joined in any suitable manner, e.g., fasteners, adhesive, etc. The tether 72 may assist in retaining the position of the airbag 20 relative to the D-ring 14. In other words, the tether 72 may prevent movement of the airbag 20 relative to the D-ring 14, e.g., along the longitudinal axis A of the webbing 18. The tether 72 may be any suitable material, e.g., plastic woven fabric, etc.

The airbag assembly 46 may include a cover 74 extending over the airbag 20 in the uninflated position, as shown in FIG. 2B. In other words, the cover 74 may enclose the airbag 20 in the uninflated position. The cover 74 may be a class-A surface, i.e., a finished surface exposed to view by a customer and free of unaesthetic blemishes and defects. In one example, the cover 74 extends around the airbag 20 in the inflated position, as shown in FIG. 3B. In other words, the cover 74 may enclose the airbag 20 in both the uninflated and the inflated positions. In such an example, the cover 74 may expand during inflation of the airbag 20. The cover 74 may be any suitable material that expands during inflation of the airbag 20, e.g., elastane, latex, etc. In other words, the cover 74 may be stretchable. In such an example, the cover 74 may, for example, be a single continuous unit, e.g., a single piece of fabric. As another example, the cover 74 may include a plurality of segments, i.e., two or more. The segments may be attached to each other in any suitable fashion, e.g., a plurality of panels attached by stitching, ultrasonic welding, etc. As yet another example, the cover 74 may be a mesh fabric.

In another example, the airbag 20 may extend through the cover 74 in the inflated position. In such an example, the cover 74 may include a tear seam (not shown). For example, the tear seam may be disposed between the occupant and the webbing 18. In other words, the tear seam may face the occupant. The tear seam may be disposed adjacent to the airbag 20. Specifically, the tear seam may be disposed adjacent to the first portion 22 and the second portion 24 of the airbag 20. For example, the tear seam may extend from the first portion 22 to the second portion 24, e.g., along the longitudinal axis A of the webbing 18. Alternatively, the tear seam may include a first segment disposed adjacent to the first portion 22 and a second segment disposed adjacent to the second portion 24. The airbag 20, e.g., the first portion 22 and the second portion 24, may extend through the tear seam in the inflated position. The tear seam may have any suitable shape. For example, the tear seam may have a linear shape extending, i.e., extending along the longitudinal axis A of the webbing 18. Alternatively, the tear seam may have a circular shape extending around the airbag 20. In such an example, the cover may be any suitable material, e.g., nylon, polyester, etc.

The tear seam may be designed to tear apart when subjected to a tensile force above a threshold magnitude. In other words, the cover 74 on one side of the tear seam separates from the cover 74 on the other side of the tear seam when the force is above the threshold magnitude. The threshold magnitude may be chosen to be greater than forces from, e.g., inadvertent pushing against the webbing 18 by an occupant but be less than forces from the deployment of the airbag 20. The tear seam may be, for example, a line of perforations through the cover 74, a line of thinner cover material than the rest of the cover 74, etc.

The inflator 48 is in fluid communication with the airbag 20. The inflator 48 expands the airbag 20 with inflation medium, such as a gas, to move the airbag 20 from the uninflated position to the inflated position. The inflator 48 may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIG. 1B, the inflator 48 may be supported by any suitable component. For example, the inflator 48 may be supported by the B-pillar 40. The inflator 48 may be fixed to the B-pillar 40, e.g., by fasteners. The inflator 48 may be disposed adjacent to the D-ring 14. For example, the D-ring 14 may be disposed between the inflator 48 and the pillar trim 42.

The inflator 48 may be, for example, connected to the airbag 20 through a fill tube 76, as shown in FIG. 1B. For example, the fill tube 76 extends through the opening 44 in the pillar trim 42. The tether 72 may extend around the fill tube 76 such that the tether 72 blocks the fill tube 76 from view of the occupant. In other words, the tether 72 covers the fill tube 76 from the opening 44 of the pillar trim 42 to the airbag 20. The fill tube 76 may, for example, extend from the inflator 48 into the first portion 22 of the airbag 20. In this situation, the first portion 22 is in direct fluid communication with the fill tube 76, and the second portion 24 is in indirect fluid communication with the fill tube 76, e.g., through the intermediate portion 26. Alternatively, the fill tube 76 may extend into the first portion 22 and through the intermediate portion 26, e.g., at least one channel 70, to the second portion 24 of the airbag 20. In this situation, both the first portion 22 and the second portion 24 of the airbag 20 may be in direct fluid communication with the fill tube 76.

Figure 4:
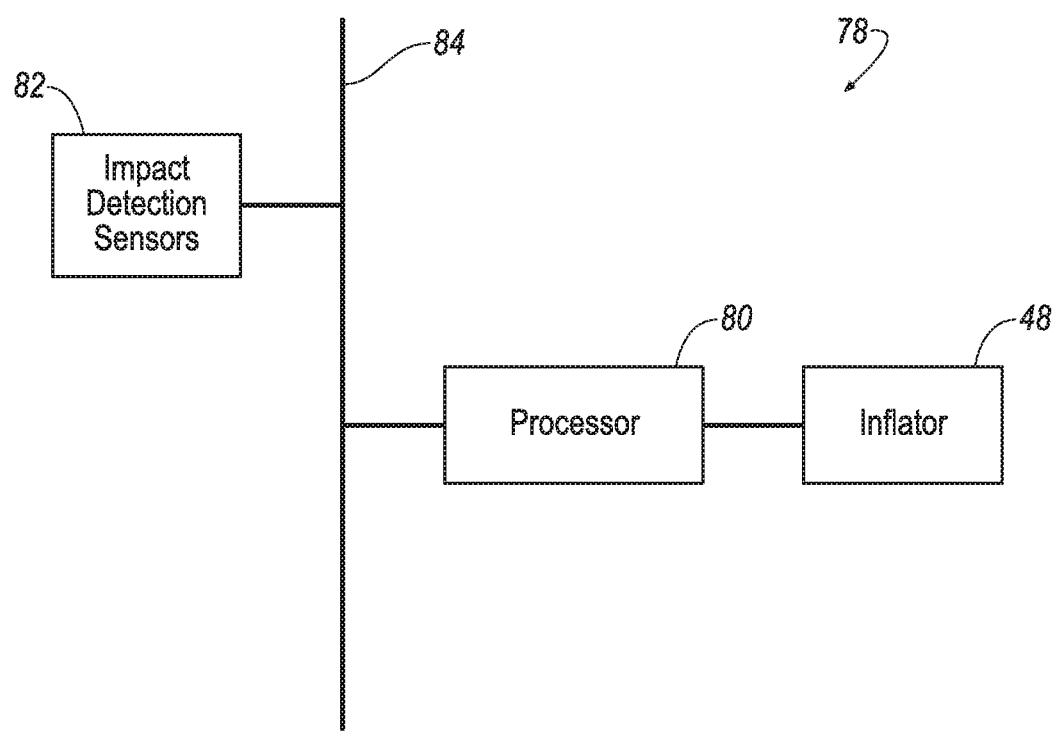
FIG. 4 is a block diagram of an inflation system of the vehicle.

With reference to FIG. 4, the vehicle 10 may include an inflation system 78 having a computer. The computer may be a microprocessor-based computing device implemented via circuits, chips, or other electronic components. For example, the computer may include a processor 80, memory, etc. The memory may store instructions executable by the processor 80 and the processor 80 may read the instructions from the memory and execute the instructions. The processor 80 may be programmed to initiate an inflation of the airbag 20 in response to the vehicle impact.

The vehicle 10 may include impact detection sensors 82 programmed to detect the vehicle impact to the vehicle 10. The impact detection sensors 82 may be disposed in the vehicle 10. The impact detection sensors 82 may be of various types, e.g., pressure sensor, acceleration sensor, vision sensor, etc. When the vehicle impact occurs, the processor 80 may receive one or more signals from the impact detection sensors 82 indicating the vehicle impact. In response to receiving the signals from the impact detection sensors 82, the processor 80 may initiate the inflation of the airbag 20. Alternatively, the processor 80 may initiate the inflation of the airbag 20 selectively based on information from the impact detection sensors 82 identifying the physical characteristics of the vehicle impact, e.g., which side of the vehicle 10 impacted, amount of pressure applied to the vehicle 10, etc. and also seat occupancy information, e.g., by using the occupancy sensors 82 disposed inside the seats 28 sensing the occupancy status of the seats 28.

In order to receive the signals from the sensors 82, e.g., the impact detection sensors 82, and to initiate the inflation of the airbag 20, the processor 80 communicates with the sensors 82, e.g., the impact detection sensors 82, and the inflator 48, e.g., through a direct electrical wiring, through which an analog or a digital signal is transmitted, or through a communication network 84 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 20 is in the uninflated position, under normal operating conditions of the vehicle 10. In the event of a vehicle impact, the impact detection sensors 82 detect the impact. The impact detection sensors 82 transmit a signal indicating the vehicle impact through the communication network 84 to the computer. When the vehicle impact is detected, the computer transmits a signal through the communication network 84 triggering the inflator 48 to inflate the airbag 20 with inflation medium from the uninflated position to the inflated position. When the inflator 48 inflates the airbag 20 to the inflated position, the inflation medium flows into the first portion 22 and through the intermediate portion 26 to the second portion 24, increasing the pressure in each of the first portion 22 and the second portion 24. As the pressure is increased in the inflation chamber 54, the airbag 20 extends towards the torso of the occupant seated in the seat 28. As the occupant moves relative to the seat 28, the occupant moves towards the webbing 18 and the airbag 20. When the occupant impacts the airbag 20, the webbing 18 and the airbag 20 controls kinematics of the occupant. For example, the intermediate portion 26 is spaced from the torso of the occupant such that the airbag 20 may redistribute a load on the torso of the occupant away from the intermediate portion 26 of the airbag 20. By redistributing the load away from the intermediate portion 26, the seatbelt assembly 12 may reduce momentum of the occupant while also limiting chest compression of the occupant during the vehicle impact.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," "third," "fourth," "fifth," and "sixth" are used throughout this document as identifiers and are not intended to signify importance or order. Many modifications and variations of the present disclosure are possible in light of the above teachings, and the disclosure may be practiced otherwise than as specifically described.

What is claimed is:

1. A seatbelt assembly comprising:
a D-ring;
a clip spaced from the D-ring;
a webbing slideably engaged with the D-ring and the clip;
an airbag slideably receiving the webbing between the D-ring and the clip;
the airbag including a first portion, a second portion, and an intermediate portion therebetween, the first portion and second portion being inflatable to an inflated position and the intermediate portion being uninflatable; and
an inflator disposed adjacent to the D-ring and a fill tube extending from the inflator into the first portion of the airbag;
wherein the airbag defines an inflation chamber, the airbag includes a sleeve disposed in the inflation chamber and extending around the webbing;
wherein the airbag includes a tether fixed to the D-ring and the sleeve;
wherein the tether extends around the fill tube.

2. The seatbelt assembly of claim 1, wherein the airbag is fixed relative to the D-ring.

3. The seatbelt assembly of claim 1, wherein the intermediate portion is fixed to the sleeve along the webbing.

4. The seatbelt assembly of claim 1, wherein the first portion and the second portion each include an end spaced from the intermediate portion, the ends of the first and second portions being fixed to the sleeve.

5. The seatbelt assembly of claim 1, wherein the sleeve is plastic.

6. The seatbelt assembly of claim 1, wherein the webbing is elongated along a longitudinal axis, the airbag has a rectangular shape in cross-section transverse to the longitudinal axis.

7. The seatbelt assembly of claim 1, wherein the intermediate portion is elongated from the first portion to the second portion.

8. The seatbelt assembly of claim 1, wherein the first portion is in fluid communication with the second portion through the intermediate portion.

9. The seatbelt assembly of claim 1, wherein the first portion and the second portion each include a front, a back spaced from the front, and sides extending from the front to the back, the sides are folded in an uninflated position.

10. The seatbelt assembly of claim 9, wherein the intermediate portion is disposed between the sides of the first and second portions.

11. The seatbelt assembly of claim 9, wherein the front of the first portion and the front of the second portion are spaced farther from the respective backs in the inflated position as compared to the uninflated position.

12. The seatbelt assembly of claim 9, wherein the intermediate portion is disposed between the webbing and the backs of the first and second portions in the inflated position.

13. The seatbelt assembly of claim 1, further comprising a cover enclosing the airbag in an uninflated position.

14. The seatbelt assembly of claim 13, wherein the cover includes a tear seam, the airbag extending through the tear seam in the inflated position.

15. The seatbelt assembly of claim 13, wherein the cover encloses the airbag in the inflated position.

16. A seatbelt assembly comprising:
a D-ring;
a clip spaced from the D-ring;
a webbing slideably engaged with the D-ring and the clip;
an airbag slideably receiving the webbing between the D-ring and the clip;
the airbag including a first portion, a second portion, and an intermediate portion therebetween, the first portion and second portion being inflatable to an inflated position and the intermediate portion being uninflatable;
the airbag defining an inflation chamber, the airbag including a sleeve disposed in the inflation chamber and extending around the webbing; and
the intermediate portion extending around the sleeve and being fixed to the sleeve.

17. The seatbelt assembly of claim 16, wherein intermediate portion is fixed to the sleeve along the webbing.

18. The seatbelt assembly of claim 16, wherein the intermediate portion is fixed to the sleeve around the webbing.

19. The seatbelt assembly of claim 16, wherein the intermediate portion and the sleeve define a channel therebetween, the second portion is in fluid communication with the first portion via the cavity.

20. The seatbelt assembly of claim 16, wherein the airbag is fixed relative to the D-ring.

* * * * *